United States Patent
Mohamed Ali Baharia

(10) Patent No.: US 11,647,109 B2
(45) Date of Patent: May 9, 2023

(54) SYSTEM AND METHOD FOR DELETING OR EDITING SENT MESSAGES FROM YOUR RECIPIENTS CHAT HISTORY

(71) Applicant: Mohamed Abdelfattah Mohamed Ali Baharia, Saga (JP)

(72) Inventor: Mohamed Abdelfattah Mohamed Ali Baharia, Saga (JP)

(*) Notice: Subject to any disclaimer, the term of this patent is extended or adjusted under 35 U.S.C. 154(b) by 0 days.

(21) Appl. No.: 16/343,791

(22) PCT Filed: Aug. 11, 2018

(86) PCT No.: PCT/JP2018/030162
§ 371 (c)(1),
(2) Date: Apr. 22, 2019

(87) PCT Pub. No.: WO2020/035889
PCT Pub. Date: Feb. 20, 2020

(65) Prior Publication Data
US 2021/0211534 A1    Jul. 8, 2021

(51) Int. Cl.
*H04W 4/12* (2009.01)
*H04M 1/7243* (2021.01)

(52) U.S. Cl.
CPC .................................. *H04M 1/7243* (2021.01)

(58) Field of Classification Search
CPC ....... H04M 1/7243; H04W 4/14; H04W 4/12; H04W 88/184
See application file for complete search history.

(56) References Cited

U.S. PATENT DOCUMENTS

| | | | |
|---|---|---|---|
| 8,671,131 B2* | 3/2014 | Collet | H04L 51/12 709/200 |
| 2002/0107928 A1* | 8/2002 | Chalon | G06Q 10/107 709/206 |
| 2005/0044109 A1 | 2/2005 | Nanba | |
| 2015/0236990 A1* | 8/2015 | Shan | H04L 51/046 709/206 |
| 2015/0256666 A1* | 9/2015 | Peterson | H04W 4/14 455/412.1 |
| 2017/0012917 A1* | 1/2017 | Yang | H04W 12/02 |
| 2017/0325079 A1* | 11/2017 | Zhao | H04M 1/72436 |
| 2018/0248838 A1* | 8/2018 | Systrom | H04L 51/02 |
| 2019/0379622 A1* | 12/2019 | Iyer | H04L 65/1016 |
| 2021/0099539 A1* | 4/2021 | Shortt | H04L 51/04 |

FOREIGN PATENT DOCUMENTS

| | | |
|---|---|---|
| JP | 2005072638 A | 3/2005 |
| JP | 2011164844 A | 8/2011 |
| WO | 2015043213 A1 | 4/2015 |
| WO | 2015134952 A1 | 9/2015 |

* cited by examiner

Primary Examiner — Lester G Kincaid
Assistant Examiner — Dung L Lam

(57) ABSTRACT

The method and computer implemented system disclosed herein provides options to a user for deleting or editing a message (a message may include text, audio, image, video and/or animations) that has been sent in a messaging application in a recipient's device without any restriction (e.g. without a tune limit). In one embodiment, the sending device detects a user request to delete or edit the message that has been sent to one or more recipients (e.g. group chat), the request is sent to a message server, and the message server further transmits the request to the recipient device so that the recipient device may delete or edit the message.

10 Claims, 3 Drawing Sheets

SYSTEM AND METHOD FOR DELETING OR EDITING SENT MESSAGES FROM YOUR RECIPIENTS CHAT HISTORY

TECHNICAL FIELD

The present invention generally relates to the field of electronic communications. More specifically, the present invention relates to the field of system and method for deleting or editing sent messages from your recipient's chat history.

BACKGROUND ART

Messaging applications are applications and platforms that enable messaging. Some examples of popular messaging applications include WhatsApp, WeChat, iMessage, Skype, Snapchat, Viber, Line, Blackberry Messenger and Kakao Talk. Messaging applications have been developed largely for home users but used by home and business users alike. Slack focuses on messaging and file sharing for work teams. Some social networking services offer messaging services as a component of their overall platform, such as Facebook's Facebook Messenger, along with Instagram and Twitter's direct messaging functions. The messaging often does not incur per message charge. It is also less disruptive than real-time communications (e.g. telephone calls). Further, it can contain more information (e.g. images or video) than other means of communications. Thus, messaging has become imminently popular.

At times, however, a user may desire to delete or edit a message that has been sent to one or more recipients. For example, the user may realise that the message is addressed to the wrong recipient, contains a typographical error, or contains undesirable content, especially those including video or an image. Until now, some messaging applications including WhatsApp, Skype, Viber and Line provide a function to delete a sent message from a recipient's device.

SUMMARY OF INVENTION

Technical Problem

However, they set a time limit to do so, for example, within 24 hours. They also limit the feature to deleting, and does not include editing. Further, a message will stay in the chat saying, for example, "This message was deleted" so that although the contents are deleted, the recipient knows the fact that the message was once sent but deleted by the sender for some reason. The inventor does believe that one owns the right to their words and speech (including media such as audio, image, video and/or animations) even after being sent to one or more recipients and therefore should have full control over them at any given time, without any restriction.

Solution to Problem

The method and computer implemented system disclosed herein address the above stated need for providing options to a user for deleting or editing a message (a message may include text, audio, image, video and/or animations) that has been sent in a recipient's device without any restriction (e.g. without a time limit).

In one embodiment, a sending device receives an input to send a message to a recipient. The sending device processes the message for sending to the recipient. The recipient may be an individual user or a group of users (i.e. group chat). If the message has not been sent and the sending device detects a user request to delete or edit the message, the sending device terminates the processing of the message for sending, and deletes it, or edits and sends it to the recipient device (via the message server).

When the request is detected after the message has been sent, a request to delete or edit the message is sent to a message server. Upon receiving the request to delete or edit the message, the message server determines whether or not the message has been sent from the message server. If the message has not been sent from the message server, the message server terminates the processing of the message for sending, and deletes it, or edits and sends it to the recipient device. If the message has been sent to the recipient, the message server transmits a request to delete or edit the message to the recipient device so that the recipient device may delete or edit the message.

The request from the user to delete or edit the message may be provided by the user in a variety of ways, such as touching a representation of the recipient on a display of the user device etc. Other features and advantages will be apparent from the ac-companying drawings and from the detailed description.

Advantageous Effects of Invention

As mentioned earlier, a user may, at times, desire to delete or edit a message that has been sent to one or more recipients. For example, the user may realise that the message is addressed to the wrong recipient, contains a typographical error, or contains undesirable content, especially those including video or an image. With this invention, if you send someone such a message, you can delete or edit the message from the recipient's chat history without any restriction (e.g. without a time limit). For example, if you need to send someone your bank details or credit card number, you can remotely delete the message from the recipient's device after they're done with it. It could also be one way of combating revenge porn.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing carries over to the description of that method step or component shown by that same numeral in any subsequent drawing herein.

DESCRIPTION OF EMBODIMENTS

Figure 1:
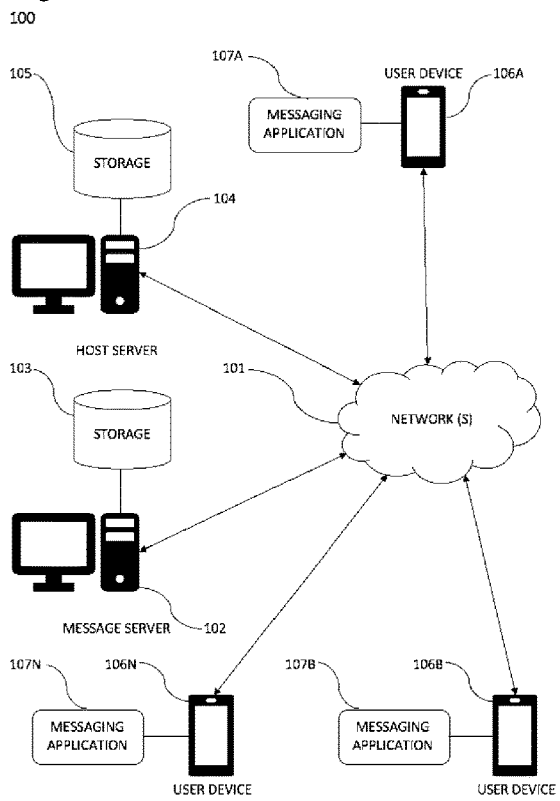
FIG. 1 illustrates a computer implemented system for deleting or editing a message sent in a messaging application.

FIG. 1 illustrates a computer implemented system for deleting or editing a message sent in a messaging application. The users are associated with user devices 106A-106N, which can be any type of computing device capable of receiving user input as well as transmitting and/or receiving data via a network. For example, the user devices 106A-106N can include conventional computer systems, such as a desktop or laptop computer, or may include devices having computer functionalities such as Personal Digital Assistants (PDA), cellular or mobile telephones, smart-phones, tablet/phablet, in- or out-of-car navigation systems, gaming devices, wearable electronic device, or other electronic devices. Some user devices are small/light and they can be carried by the user easily, and they are referred to as mobile devices.

In one embodiment, a user device (e.g. 106A) may execute a messaging application (e.g. 107A) allowing the user of the user device 106A to send a message (a message may include text, audio, image, video and/or animations) to a recipient (e.g. the user of user device 106B) executing the same messaging application (e.g. 107B). In an embodiment, the user application 107A is a special-purpose client application ("App" such as WhatsApp for iPhone or iPad, etc.), and in an embodiment the user application 107A may be an application based on a web browser (e.g., Google Chrome, Microsoft Windows Internet Explorer, Mozilla Firefox, and Apple Safari etc.).

The user devices 106A-106N are configured to communicate with each other via a network 101 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 101 may be wired, wireless, or a combination of both. In one embodiment, the network 101 uses standard communications technologies and/or protocols, Thus, the network 101 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (COMA), Digital Subscriber Line (DSL), cable modems, etc. Similarly, the networking protocols used on the network 101 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 101 may be represented using technologies and/or formats including Hypertext Markup Language (HTML), Extensible Markup Language (XML), Extensive Messaging and Presence Protocol (XMPP) or JavaScript Object Notation (BON), among other formats. In addition, all or some of links can be encrypted using conventional encryption technologies such as Secure Sockets Layer (SSL), Transport Layer Security (TLS), or Internet Protocol security (IPsec).

The message server 102 and/or the host server 104 are deployed, for example, in carrier networks and in a cloud computing environment. As used herein, "cloud computing environment" refers to a processing environment comprising configurable computing physical and logical resources, for example, networks, servers, storage, applications, services, etc., and data distributed over the network 101. The cloud computing environment provides on-demand network access to a shared pool of the configurable computing physical and logical resources. In an embodiment, the message server 102 is a cloud computing based platform implemented as a service for deleting or editing a message sent in a messaging application. The message server 102 and/or the host server 104 are developed, for example, using the Google App engine cloud infrastructure of Google Inc. In an embodiment, multiple platforms are used to implement the message server 102 and/or the host server 104. The platforms comprise, for example, a cloud computing based platform, a web services based platform, etc. The message server 102 and/or the host server 104 are deployed in multiple configurations, for example, in a data center of a network carrier, in a cloud infrastructure such as Amazon Web Services of Amazon Technologies, Inc. etc., in a data center implemented by the message server 102 and/or the host server 104, in a data center hosted by a third party system, etc.

When a user requests a user device (e.g. user device 106A) to send a message to a recipient, (e.g. the user of user device 106B), the message is delivered via message server 102. The message server 102 receives the message from the sender and delivers the message to the recipient. According to embodiments set forth herein, the message may be deleted or edited by one or more different entities without any restriction (e.g. without a time limit). If the message has not been sent from the user device, the messaging application within the user device (e.g. messaging application 107A) may terminate processing of the message for sending, and deletes it, or edits and sends it to the recipient (via the message server 102). If the message has been sent from the user device to message server 102, the message server 102 may delete the message, or edit and send the message to the recipient. If the message has been sent from the message server 102, the message server may request to delete or edit the message from the recipient device (e.g. user device 106B and messaging application 107B). The ways of deleting or editing messages are discussed in further detail herein.

The host server 104 stores user profiles etc. Further, if a recipient device (e.g. 106B) does not have connectivity to the messaging application (e.g. 107B), then the message server 102 requests the host server 104 to send notifications to the recipient device. On receiving the notification, the recipient device can retrieve the message from the message server 102.

Figure 2:
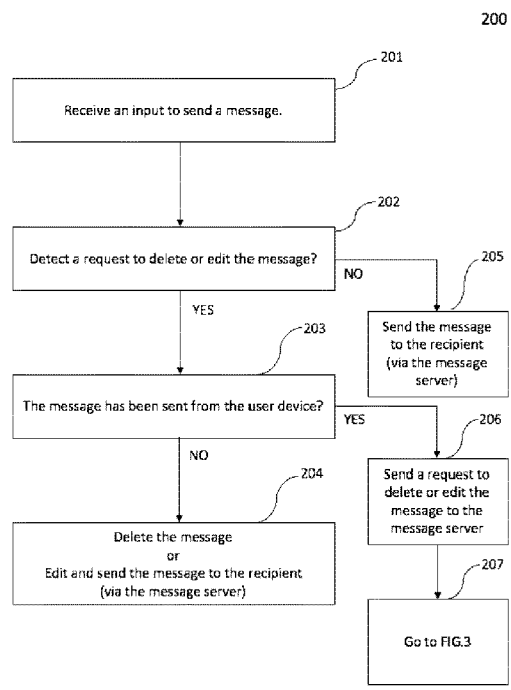
FIG. 2 is a flow diagram illustrating a method for deleting or editing a message sent in a messaging application at a user device.

FIG. 2 is a flow diagram illustrating a method for deleting or editing a message at a user device. For example, the user device may be user device 106A of FIG. 1. In one embodiment, the message includes text, audio, image, video and/or animations. In one embodiment, the message includes one or more of: an identification of a user account associated with the sending device, an identification of the sending device, an identification of a user account associated with the recipient device, a transaction/message identifier, etc.

At reference 201, a user device receives an input to send a message to a recipient. In one embodiment, the user is a user of a messaging application. In one embodiment, the recipient may be an individual user or a group of users (i.e. group chat). At reference 202, the user device determines whether or not the user device has detected an input to delete or edit the message. In one embodiment, the user device determines if a request to delete or edit the message is received. If there is no such request while processing the message for sending, the user device sends the message to the recipient at reference 205 (via the message server 102). If there is such a request, the user device determines if the message has been sent to the recipient at reference 203. If the message has been sent from the user device, method 200 proceeds FIG. 3 at reference 207, which starts another process for deleting or editing the message at the message server as discussed herein below. If the message has not been sent from the user device, the user device deletes the message, or edits and sends the message to the recipient at reference 204 (via message server 102).

An input requesting to delete or edit a message may be implemented using one or more of a variety of sensors. For example, the user device may include a display screen capable of touch input (often referred to as a touch screen).

Figures 3, 4:
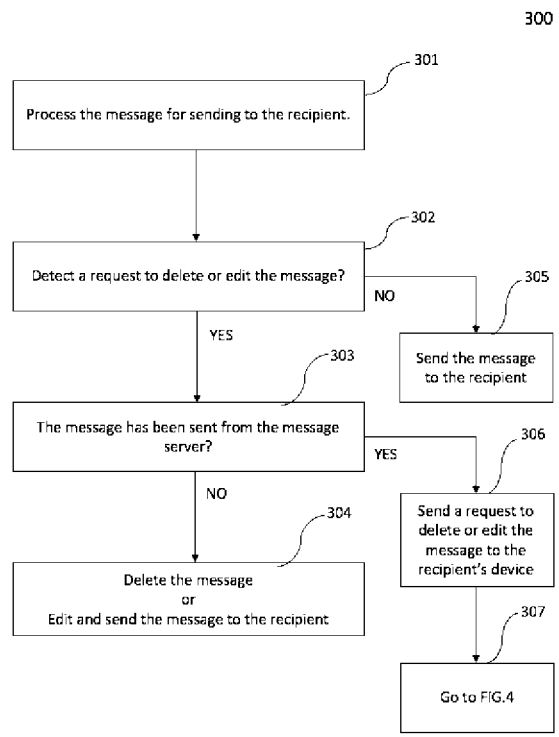
FIG. 3 is a flow diagram illustrating a method for deleting or editing a message sent in a messaging application at a message server.
FIG. 4 is a flow diagram illustrating a method for deleting or editing a message sent in a messaging application at a recipient's device.

FIG. 3 is a flow diagram illustrating a method for deleting or editing a message at message server 102. At reference 202 of FIG. 2, a user device receives a request to delete or edit a message. At reference 203, the user device determines that the message was sent to the message server 102. In response, the user device sends a request to delete or edit the message to the message server 102 at reference 206. The request contains a message identifier to enable the message server to determine which message to delete or edit. The identifier of the message may be a transaction identifier or other unique identifier of the message.

At reference 301, the message server 102 processes the message for sending to a user device. At reference 302, the message server 102 determines whether or not the message server 102 has detected a request to delete or edit the message. In one embodiment, the message server 102 determines if a request to delete or edit the message is received. If there is no such request, the message server 102 sends the message to the recipient at reference 305. If there is such a request, the user device determines if the message has been sent to the recipient at reference 303. If the message has been sent from the message server 102, method 300 proceeds FIG. 4 at reference 307, which starts another process for deleting or editing the message at the recipient device as discussed herein below. If the message has not been sent from the message server 102, the message server 102 deletes the message, or edits and sends the message to the recipient at reference 304.

FIG. 4 is a flow diagram illustrating a method for deleting or editing a message at a recipient's device. For example, the recipient's device may be user device 1068 of FIG. 1. At reference 202 of FIG. 2, a user device receives a request to delete or edit a message. At reference 203, the user device determines that the message has been sent to the message server 102. In response, the user device sends a request to delete or edit the message to the message server 102 at reference 206. At reference 301, the message server 102 processes the message for sending to a recipient's device. At reference 302, the message server 102 determines that the message has been sent to the recipient's device. In response, the message server 102 sends a request to delete or edit the message to the recipient's device at reference 306. In one embodiment, the recipient's device determines if a request to delete or edit the message is received at reference 401. If there is no such request, the message remains to be stored at the recipient's device. If there is such a request, the recipient's device deletes or edits the message at reference 402.

In one embodiment, user device 106B sends confirmation of a result of the request to delete or edit towards the user device 106A via the message server 102.

Figure 5:
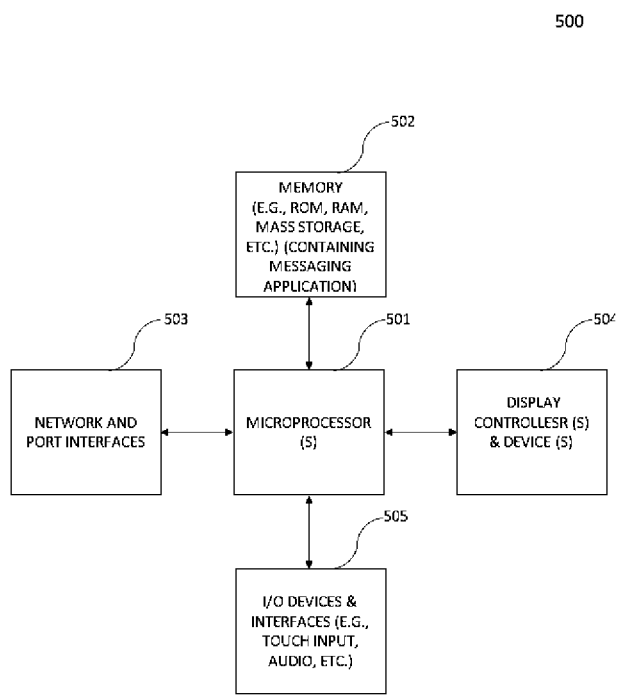
FIG. 5 illustrates the architecture of a computer system employed by a message server for the method for deleting or editing a message sent in a messaging application.

FIG. 5 illustrates the architecture of a computer system to perform a method for deleting or editing a message sent in a messaging application. In some embodiments, this is a high-level view of one or more components of the message server 102 and the host server 104. In another embodiment, system 500 is a high-level view of one of user devices 106A-N. Data processing system 500 includes one or more microprocessors 501 and connected system components (e.g. multiple connected chips). Alternatively, data processing system 500 is a system on a chip.

Data processing system 500 includes memory 502, which is coupled to micro-processor(s) 501. Memory 502 may be used for storing data, metadata, and programs for execution by the microprocessor(s) 501. Memory 502 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 502 may be internal or distributed memory.

Data processing system 500 includes network and port interfaces 503, such as a port, connector for a dock, or a connector for a USB interface, FireWire, Thunderbolt, Ethernet, Fibre Channel, etc. to connect the system 500 with another device, external component, or a network. Exemplary network and port interfaces 503 also include wireless transceivers, such as an IEEE 802.11 transceiver, an infrared transceiver, a Bluetooth transceiver, a wireless cellular telephony transceiver (e.g. 2G, 3G, 4G, etc.), or another wireless protocol to connect data processing system 500 with another device, external component, or a network and receive stored instructions, data, tokens, etc.

Data processing system 500 also includes display controller and display device 504 and one or more input or output ("I/O") devices and interfaces 505. Display controller and display device 504 provides a visual user interface for the user. I/O devices 505 allow a user to provide input to, receive output from, and otherwise transfer data to and from the system. I/O devices 505 may include a mouse, keypad or a keyboard, a touch panel or a multi-touch input panel, camera, optical scanner, audio input/output (e.g. microphone and/or a speaker), an accelerometer, other known I/O devices or a combination of such I/O devices. It will be appreciated that one or more buses, may be used to interconnect the various components shown in FIG. 5.

As used herein, the terms computer, device, system, processing system, processing device, and "apparatus comprising a processing device" may be used interchangeably with data processing system 500 and include the above-listed exemplary embodiments.

Additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented method(s) of message withdrawal described herein may be carried out in a computer system or other data processing system 500 in response to its processor or processing system 501 executing sequences of instructions contained in a memory, such as memory 502 or other non-transitory machine-readable storage medium. For example, memory 502 may store messaging application 107 etc. The software may further be transmitted or received over a network (not shown) via network interface device 503. In various embodiments, hardwired circuitry may be used in combination with the software instructions to implement the present embodiments. Thus, the techniques are not limited to any specific combination of hardware circuitry and software, or to any particular source for the instructions executed by data processing system 500.

Different embodiments of the invention may be implemented using different combinations of software, firmware, and/or hardware. Thus, the techniques shown in the figures can be implemented using code and data stored and executed on one or more electronic devices (e.g. an end system, a network element). Such electronic devices store and communicate (internally and/or with other electronic devices over a network) code and data using computer-readable media, such as non-transitory computer-readable storage media (e.g. magnetic disks; optical disks; random access memory; read only memory; flash memory devices; phase-change memory) and transitory computer-readable transmission media (e.g. electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g. a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As detailed herein, some embodiments of a method for deleting or editing a message include receiving, by a mobile device, an input to send a message to a recipient; processing by the mobile device, the message for transmittal to the recipient; detecting, by the mobile device, a request to delete or edit the message; determining that the message has not been sent from the mobile device in response to detecting the request; and terminating, by the mobile device, the processing of the message for sending in response to the detection of the request and the determination that the message has not been sent.

Additionally some embodiments of the method further include one or more of: 1) In some embodiments of the method, the detection comprises of detecting a touch or tap of a representation of the recipient on display of the mobile device; 2) In some embodiments of the method, the method further includes detecting a request from the user to delete or edit the message; determining that the message has been sent from the mobile device; and sending, to a message server coupled to the mobile device and an electronic device of the recipient, a request to delete or edit the message upon the determination, the request to delete or edit containing a message identifier of the message; 3) In some embodiments of the method, the request to delete or edit, when executed by the message server, causes the message server to delete or edit the message; 4) In some embodiments of the method, the request to delete or edit, when executed by the message server, causes the message server to determine whether the message has been sent from the message server toward the electronic device of the recipient and to transmit a request to delete or edit to the electronic device of the recipient upon the determination that the message has been sent to the electronic device, and wherein the request to delete or edit includes the identifier of the message; 5) In some embodiments of the method, the request to delete or edit of the message may cause the electronic device to perform the following: deleting or editing the message in the electronic device, and sending a notification of a result of the request to delete or edit toward the mobile device.

As detailed herein, some embodiments of a non-transitory machine-readable medium storing instructions for deleting or editing of a message, the instructions include receiving, by a mobile device, an input to send a message to a recipient; processing, by the mobile device, the message for transmittal to the recipient; detecting, by the mobile device, a request to delete or edit the message; determining that the message has not been sent from the mobile device in response to detecting the request; and terminating, by the mobile device, the processing of the message for sending in response to the detection of the request and the determination that the message has not been sent.

Additionally some embodiments of the method further include one or more of: 1) In some embodiments of the non-transitory machine-readable medium, the detection comprises of detecting a touch or tap of a representation of the recipient on display of the mobile device; 2) In some embodiments of the non-transitory machine-readable medium, the method further includes detecting a request to delete or edit the message; determining that the message has been sent from the mobile device; and sending, to a message server coupled to the mobile device and an electronic device of the recipient, a request to delete or edit the message upon the determination, the request to delete or edit containing a message identifier of the message; 3) In some embodiments of the non-transitory machine-readable medium, the request to delete or edit, when executed by the message server, causes the message server to delete or edit the message; 4) In some embodiments of the non-transitory machine-readable medium, the request to delete or edit, when executed by the message server, causes the message server to determine whether the message has been sent from the message server toward the electronic device of the recipient and to transmit a request to delete or edit to the electronic device of the recipient upon the determination that the message has been sent to the electronic device, and wherein the request to delete or edit includes the identifier of the message; 5) In some embodiments, the request to delete or edit of the message causes the electronic device to perform the following: deleting or editing the message in the electronic device, and sending a notification of a result of the request to delete or edit toward the mobile device.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:
1. A method comprising:
providing a data processing system comprising a user device of a sender, a user device of a recipient, a message server, and a host server communicating with each other over a network;

providing a messaging application configured for execution in the user device of the sender, the message server, and the user device of the recipient;

receiving, by the messaging application in the user device of the sender, an input to send a message to a recipient;

processing, by the messaging application in the user device of the sender, the message for transmittal to the recipient;

detecting, by the messaging application in the user device of the sender, a request from the sender to edit or delete the message without a time limit for editing or deleting the message; determining by the messaging application in the user device of the sender, that the message has been sent from the user device of the sender to the message server coupled to the user device of the recipient;

sending, by the messaging application in the user device of the sender, the request to edit the message upon determining that the message has been sent from the user device of the sender to the message server coupled to the user device of the recipient; and in response to receiving by the message server the request to edit and determining by the message server that the message is received by the message server and not yet received by the user device of the recipient, the message server editing the message in a memory of the message server and the message server transmitting the edited message to the user device of the recipient.

2. The method of claim 1, wherein the detection comprises:

detecting, by the messaging application in the user device of the sender, a touch or tap of a representation of the recipient on a display of the user device of the sender.

3. The method of claim 1, wherein the message comprises one or more of text, audio, image, video and animations.

4. The method of claim 1, further comprising, the messaging application in the message server sending a notification of a result of the request to edit message back to the user device of the sender when the message is edited by the messaging application in the message server.

5. The method of claim 1, further comprising, the messaging application in the user device of the recipient sending a notification of a result of the request to edit the message back to the user device of the sender via the message server when the message is edited by the messaging application in the user device of the recipient.

6. A non-transitory computer-readable storage medium having instructions stored therein, which when executed by a processor, cause the processor to perform operations, the operations comprising:

receiving, by a messaging application in a user device of a sender, an input to send a message to a user device of a recipient;

processing, by the messaging application in the user device of the sender, the message for transmittal to the user device of the recipient;

detecting, by the messaging application in the user device of the sender, a request from the sender to delete or edit the message without a time limit for editing or deleting the message;

determining, by the messaging application in the user device of the sender, that the message has been sent from the user device of the sender to the message server that is coupled to the user device of the recipient;

sending, by the messaging application in the user device of the sender, the request to edit the message upon determining that the message has been sent from the user device of the sender to the message server coupled to the user device of the recipient; and in response to receiving by the message server the request to edit and determining by the message server that the message is received by the message server and not yet received by the user device of the recipient, the message server editing the message in a memory of the message server and the message server transmitting the edited message to the user device of the recipient.

7. The non-transitory computer-readable storage medium of claim 6, wherein the detection comprises of detecting a touch or tap of a representation of the recipient on a display of the user device.

8. The non-transitory computer-readable storage medium of claim 6, wherein the message comprises one or more of the text, audio, image, video and animations.

9. The non-transitory computer readable storage medium of claim 6, further comprising, the messaging application in the message server sending a notification of a result of the request to edit the message back to the user device of the sender when the message is edited by the messaging application in the message server.

10. The non-transitory computer readable storage medium of claim 6, further comprising, the messaging application in the user device of the recipient sending a notification of a result of the request to edit the message back to the user device of the sender via the message server when the message is edited by the messaging application in the user device of the recipient.

* * * * *